US012008957B2

(12) United States Patent
Zhang

(10) Patent No.: US 12,008,957 B2
(45) Date of Patent: Jun. 11, 2024

(54) PIXEL COMPENSATION CIRCUIT, DISPLAY PANEL AND DISPLAY DEVICE

(71) Applicant: Shenzhen China Star Optoelectronics Semiconductor Display Technology Co., Ltd., Shenzhen (CN)

(72) Inventor: Liuqi Zhang, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/431,157

(22) PCT Filed: Jun. 9, 2021

(86) PCT No.: PCT/CN2021/099086
§ 371 (c)(1),
(2) Date: Aug. 14, 2021

(87) PCT Pub. No.: WO2022/252267
PCT Pub. Date: Dec. 8, 2022

(65) Prior Publication Data

US 2024/0013716 A1 Jan. 11, 2024

(30) Foreign Application Priority Data

May 31, 2021 (CN) ......................... 202110599732.7

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2310/08* (2013.01); *G09G 2320/045* (2013.01)

(58) Field of Classification Search
CPC ......... G09G 3/3233; G09G 2300/0819; G09G 2300/0842; G09G 2310/08; G09G 2320/045
See application file for complete search history.

(56) References Cited

U.S. PATENT DOCUMENTS

2010/0177125 A1 7/2010 Miwa
2011/0164025 A1 7/2011 Saito et al.
2011/0249044 A1 10/2011 Ebisuno
2013/0120342 A1 5/2013 Wang et al.
(Continued)

FOREIGN PATENT DOCUMENTS

CN 101515435 A 8/2009
CN 102651189 A 8/2012
(Continued)

*Primary Examiner* — Amit Chatly
(74) *Attorney, Agent, or Firm* — Nathan & Associates; Menachem Nathan

(57) ABSTRACT

A pixel compensation circuit, a display panel and a display device are disclosed according to an embodiment of the present disclosure. Through detecting the threshold voltage of the driving transistor and offsetting the threshold voltage of the driving transistor from the driving current of the light emitting unit, the driving current becomes unrelated to the threshold voltage of the driving transistor. This could solve the conventional issues of uneven display effect when the driving current of the light emitting unit is affected by the shift of the threshold voltage of the driving transistor.

18 Claims, 3 Drawing Sheets

(56) References Cited

U.S. PATENT DOCUMENTS

| | | | | |
|---|---|---|---|---|
| 2016/0117981 | A1 | 4/2016 | Lee et al. | |
| 2016/0240139 | A1* | 8/2016 | Yang .................... | G09G 3/3258 |
| 2016/0307500 | A1 | 10/2016 | Han | |
| 2017/0039940 | A1* | 2/2017 | Han ..................... | G09G 3/3266 |

FOREIGN PATENT DOCUMENTS

| | | | |
|---|---|---|---|
| CN | 102708794 | A | 10/2012 |
| CN | 103165080 | A | 6/2013 |
| CN | 104658482 | A | 5/2015 |
| CN | 105096838 | A | 11/2015 |
| CN | 107093405 | A | 8/2017 |
| CN | 107492345 | A | 12/2017 |
| CN | 108648696 | A | 10/2018 |
| CN | 110232889 | A | 9/2019 |
| KR | 20100045578 | A | 5/2010 |

* cited by examiner

PIXEL COMPENSATION CIRCUIT, DISPLAY PANEL AND DISPLAY DEVICE

FIELD OF THE DISCLOSURE

The present disclosure relates to a display technology, and more particularly, to a pixel compensation circuit, a display panel and a display device.

BACKGROUND

Organic light emitting diode (OLED) displays have advantages including self-illuminating, low driving voltage, high illuminating efficiency, high contrast, wide view angle, high response speed, low power consumption, and thus become the display panel having the most development potential.

OLED display panel could be categorized into two categories, passive matrix OLED and active matrix OLED. Because the AMOLED display panel has lower consumption than the AMOLED display panel, the AMOLED display panel is more widely used and may replace the conventional LCD panel to become the main display panel in the next generation.

Technical Problem

The AMOLED display panel uses independent thin film transistors (TFT) to control each of the pixels. Due to the long-time operation, the threshold voltages of the TFTs may shift such that the driving current flowing through the light emitting units may change accordingly. This makes the driving current of the OLED unstable and makes the AMOLED display panel display unevenly. However, the conventional pixel driving circuit does not have the function for compensating the threshold Vth of the driving TFTs. Therefore, an appropriate compensation mechanism needs to be adopted to achieve a high-quality display effect.

SUMMARY

Technical Solution

One objective of an embodiment of the present disclosure is to provide a pixel compensation circuit, a display panel and a display device to solve the above-mentioned issues.

According to an embodiment of the present disclosure, a pixel compensation circuit is disclosed. The pixel compensation circuit comprises a driving transistor, a data write-in transistor, a reset transistor, a compensation transistor, and a storage capacitor. A gate of the driving transistor is connected to a first node and a source of the driving transistor is connected to a negative electrode of a power source. A gate of the data write-in transistor is connected to a write-in signal input end, a source of the data write-in transistor is connected to a data signal input end, and a drain of the data write-in transistor is connected to a second node. A gate of the reset transistor is connected to a reset signal input end, a source of the reset transistor is connected to a reference signal input end, and a drain of the reset transistor is connected to the second node. A gate of the compensation transistor is connected to a reset signal input end, a source of the compensation transistor is connected to a positive electrode of the power source, and a drain of the compensation transistor is connected to the first node. A first end of the storage capacitor is connected to the first node, and the second end of the storage capacitor is connected to the second node.

In some embodiments, during a first period, the reset transistor and the compensation transistor are turned on, the data write-in transistor is turned off, and the driving transistor is turned on. During a second period after the first period, the reset transistor and the compensation transistor are turned on, the data write-in transistor is turned off, and the driving transistor is turned off. During a third period after the second period, the reset transistor, the compensation transistor, the data write-in transistor and the driving transistor are all turned off. During a fourth period after the third period, the driving transistor and the data write-in transistor are turned on, and the compensation transistor and the reset transistor are turned off. During a fifth period after the fourth period, the driving transistor is turned on, the data write-in transistor, the compensation transistor and the reset transistor are turned off. During a sixth period after the fifth period, the driving transistor is turned on, the data write-in transistor, the compensation transistor and the reset transistor are turned off.

In some embodiments, during the first period, a voltage level of the first node corresponds to a voltage level VDD of the positive electrode of the power source, and a voltage level of the second node corresponds to a voltage level Vi of a reference signal input end. During the second period, the voltage level of the first node corresponds to a threshold voltage Vth of the driving transistor, and the voltage level of the second node corresponds to the voltage level Vi of the reference signal input end. During the third period, the voltage level of the first node corresponds to the threshold voltage Vth of the driving transistor, and the voltage level of the second node corresponds to the voltage level Vi of the reference signal input end. During the fourth period, the voltage level of the first node corresponds to Vdata−Vi+Vth, and the voltage level of the second node corresponds to a voltage level of the data signal input end Vdata. During the fifth period, the voltage level of the first node corresponds to Vdata−Vi+Vth, and the voltage level of the second node corresponds to the voltage level of the data signal input end Vdata. During the sixth period, the voltage level of the first node corresponds to Vdata−Vi+Vth, and the voltage level of the second node corresponds to the voltage level Vdata of the data signal input end.

In some embodiments, the voltage level Vi of the reference signal input end is constant and the voltage level Vi of the reference signal input end is not larger than the voltage level Vdata of the data signal input end.

In some embodiments, during the sixth period, a driving current flowing through the driving transistor is $I=K(Vdata-Vi)^2$, where I represents the driving current, K is an intrinsically conductive factor of the driving transistor, Vdata is the voltage level of the data signal input end, and Vi is the voltage level of the reference signal input end.

In some embodiments, the driving transistor, the data write-in transistor, the reset transistor and the compensation transistor are P-type thin film transistors (TFT) or N-type TFTs.

In some embodiments, the driving transistor, the data write-in transistor, the reset transistor and the compensation transistor are one type of low temperature poly-silicon (LTPS) TFT, oxide semiconductor TFT or amorphous silicon (a-Si) TFT.

According to an embodiment of the present disclosure, a display panel is disclosed. The display panel includes a light emitting unit and a pixel compensation circuit. The light emitting unit has an anode connected to a positive electrode of a power source and a cathode. The pixel compensation circuit that is connected to the cathode of the light emitting unit and comprises a driving transistor, a data write-in transistor, a reset transistor, a compensation transistor, and a storage capacitor. A gate of the driving transistor is connected to a first node and a source of the driving transistor is connected to a negative electrode of a power source. A gate of the data write-in transistor is connected to a write-in signal input end, a source of the data write-in transistor is connected to a data signal input end, and a drain of the data write-in transistor is connected to a second node. A gate of the reset transistor is connected to a reset signal input end, a source of the reset transistor is connected to a reference signal input end, and a drain of the reset transistor is connected to the second node. A gate of the compensation transistor is connected to a reset signal input end, a source of the compensation transistor is connected to a positive electrode of the power source, and a drain of the compensation transistor is connected to the first node. A first end of the storage capacitor is connected to the first node, and the second end of the storage capacitor is connected to the second node.

In some embodiments, during a first period, the reset transistor and the compensation transistor are turned on, the data write-in transistor is turned off, and the driving transistor is turned on. During a second period after the first period, the reset transistor and the compensation transistor are turned on, the data write-in transistor is turned off, and the driving transistor is turned off. During a third period after the second period, the reset transistor, the compensation transistor, the data write-in transistor and the driving transistor are all turned off. During a fourth period after the third period, the driving transistor and the data write-in transistor are turned on, and the compensation transistor and the reset transistor are turned off. During a fifth period after the fourth period, the driving transistor is turned on, the data write-in transistor, the compensation transistor and the reset transistor are turned off. During a sixth period after the fifth period, the driving transistor is turned on, the data write-in transistor, the compensation transistor and the reset transistor are turned off.

In some embodiments, during the first period, a voltage level of the first node corresponds to a voltage level VDD of the positive electrode of the power source, and a voltage level of the second node corresponds to a voltage level Vi of a reference signal input end. During the second period, the voltage level of the first node corresponds to a threshold voltage Vth of the driving transistor, and the voltage level of the second node corresponds to the voltage level Vi of the reference signal input end. During the third period, the voltage level of the first node corresponds to the threshold voltage Vth of the driving transistor, and the voltage level of the second node corresponds to the voltage level Vi of the reference signal input end. During the fourth period, the voltage level of the first node corresponds to Vdata−Vi+Vth, and the voltage level of the second node corresponds to a voltage level of the data signal input end Vdata. During the fifth period, the voltage level of the first node corresponds to Vdata−Vi+Vth, and the voltage level of the second node corresponds to the voltage level of the data signal input end Vdata. During the sixth period, the voltage level of the first node corresponds to Vdata−Vi+Vth, and the voltage level of the second node corresponds to the voltage level Vdata of the data signal input end.

In some embodiments, the voltage level Vi of the reference signal input end is constant and the voltage level Vi of the reference signal input end is not larger than the voltage level Vdata of the data signal input end.

In some embodiments, during the sixth period, a driving current flowing through the driving transistor is $I=K(Vdata-Vi)^2$, where I represents the driving current, K is an intrinsically conductive factor of the driving transistor, Vdata is the voltage level of the data signal input end, and Vi is the voltage level of the reference signal input end.

In some embodiments, the driving transistor, the data write-in transistor, the reset transistor and the compensation transistor are P-type thin film transistors (TFT) or N-type TFTs.

In some embodiments, the driving transistor, the data write-in transistor, the reset transistor and the compensation transistor are one type of low temperature poly-silicon (LTPS) TFT, oxide semiconductor TFT or amorphous silicon (a-Si) TFT.

According to an embodiment of the present disclosure, a display device is disclosed. The display device comprises the display panel. a display panel is disclosed. The display panel includes a light emitting unit and a pixel compensation circuit. The light emitting unit has an anode connected to a positive electrode of a power source and a cathode. The pixel compensation circuit that is connected to the cathode of the light emitting unit and comprises a driving transistor, a data write-in transistor, a reset transistor, a compensation transistor, and a storage capacitor. A gate of the driving transistor is connected to a first node and a source of the driving transistor is connected to a negative electrode of a power source. A gate of the data write-in transistor is connected to a write-in signal input end, a source of the data write-in transistor is connected to a data signal input end, and a drain of the data write-in transistor is connected to a second node. A gate of the reset transistor is connected to a reset signal input end, a source of the reset transistor is connected to a reference signal input end, and a drain of the reset transistor is connected to the second node. A gate of the compensation transistor is connected to a reset signal input end, a source of the compensation transistor is connected to a positive electrode of the power source, and a drain of the compensation transistor is connected to the first node. A first end of the storage capacitor is connected to the first node, and the second end of the storage capacitor is connected to the second node. During a first period, the reset transistor and the compensation transistor are turned on, the data write-in transistor is turned off, and the driving transistor is turned on. During a second period after the first period, the reset transistor and the compensation transistor are turned on, the data write-in transistor is turned off, and the driving transistor is turned off. During a third period after the second period, the reset transistor, the compensation transistor, the data write-in transistor and the driving transistor are all turned off. During a fourth period after the third period, the driving transistor and the data write-in transistor are turned on, and the compensation transistor and the reset transistor are turned off. During a fifth period after the fourth period, the driving transistor is turned on, the data write-in transistor, the compensation transistor and the reset transistor are turned off. During a sixth period after the fifth period, the driving transistor is turned on, the data write-in transistor, the compensation transistor and the reset transistor are turned off.

In some embodiments, during the first period, a voltage level of the first node corresponds to a voltage level VDD of the positive electrode of the power source, and a voltage level of the second node corresponds to a voltage level Vi of a reference signal input end. During the second period, the voltage level of the first node corresponds to a threshold voltage Vth of the driving transistor, and the voltage level of the second node corresponds to the voltage level Vi of the reference signal input end. During the third period, the voltage level of the first node corresponds to the threshold voltage Vth of the driving transistor, and the voltage level of the second node corresponds to the voltage level Vi of the reference signal input end. During the fourth period, the voltage level of the first node corresponds to Vdata−Vi+Vth, and the voltage level of the second node corresponds to a voltage level of the data signal input end Vdata. During the fifth period, the voltage level of the first node corresponds to Vdata−Vi+Vth, and the voltage level of the second node corresponds to the voltage level of the data signal input end Vdata. During the sixth period, the voltage level of the first node corresponds to Vdata−Vi+Vth, and the voltage level of the second node corresponds to the voltage level Vdata of the data signal input end.

In some embodiments, the voltage level Vi of the reference signal input end is constant and the voltage level Vi of the reference signal input end is not larger than the voltage level Vdata of the data signal input end.

In some embodiments, during the sixth period, a driving current flowing through the driving transistor $I=K(Vdata-Vi)^2$, where I represents the driving current, K is an intrinsically conductive factor of the driving transistor, Vdata is the voltage level of the data signal input end, and Vi is the voltage level of the reference signal input end.

In some embodiments, the driving transistor, the data write-in transistor, the reset transistor and the compensation transistor are P-type thin film transistors (TFT) or N-type TFTs.

In some embodiments, the driving transistor, the data write-in transistor, the reset transistor and the compensation transistor are one type of low temperature poly-silicon (LTPS) TFT, oxide semiconductor TFT or amorphous silicon (a-Si) TFT.

In the pixel compensation circuit, the display panel and the display device according to an embodiment of the present disclosure, the pixel compensation circuit comprises a driving transistor, a data write-in transistor, a reset transistor, a compensation transistor and a storage capacitor. Through setting the voltage level of the reset signal input end, the voltage level of the references signal input end, the voltage level of the write-in signal input end and the voltage level of the data signal input end, the pixel compensation circuit orderly enters the first period, the second period, the third period, the fourth period, the fifth period and the sixth period. In this way, through detecting the threshold voltage of the driving transistor and offsetting the threshold voltage of the driving transistor from the driving current of the light emitting unit, the driving current becomes unrelated to the threshold voltage of the driving transistor. In other words, if the threshold voltage of the driving transistor shifts, the driving current of the light emitting unit is unaffected. This could be used to solve the conventional issues of uneven display effect when the threshold voltage of the driving transistor shifts.

DETAILED DESCRIPTION

To help a person skilled in the art better understand the solutions of the present disclosure, the following clearly and completely describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present disclosure.

In the following embodiments, in the TFT, two electrodes other than the gate will be called source and drain. Because the two electrodes of the TFT are symmetric, the two electrodes are interchangeable. Based on the configuration of the TFT shown in the figures, the middle end of the TFT is regarded as the gate, the signal input end is regarded as the source and the signal output end is regarded as the drain. Furthermore, the TFTs in the embodiments could be a P-type and/or N type transistors. The P-type transistor is turned on when a low voltage is applied on the gate but is turned off when a high voltage is applied on the gate. In contrast, the N-type transistor is turned on when a high voltage is applied on the gate but is turned off when a low voltage is applied on the gate.

Figure 1:
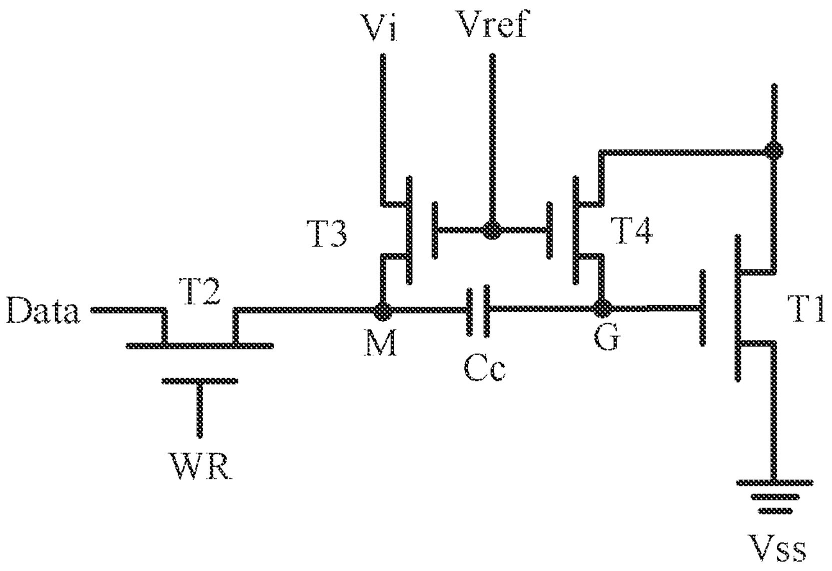
FIG. 1 is a diagram of a pixel compensation circuit according to an embodiment of the present disclosure.

Please refer to FIG. 1. FIG. 1 is a diagram of a pixel compensation circuit according to an embodiment of the present disclosure. As shown in FIG. 1, a pixel compensation is disclosed. The pixel compensation circuit comprises a driving transistor T1, a data write-in transistor T2, a reset transistor T3, a compensation transistor T4, and a storage capacitor Cc.

The gate of the driving transistor T1 is connected to the first node G and the source of the driving transistor T1 is connected to a negative electrode Vss of a power source.

The gate of the data write-in transistor T2 is connected to a write-in signal input end WR, the source of the data write-in transistor T2 is connected to a voltage level Vdata of a data signal input end, and the drain of the data write-in transistor T2 is connected to the second node M.

The gate of the reset transistor T3 is connected to a voltage level Vref of a reset signal input end, the source of the reset transistor is connected to a reference signal Vi, and the drain of the reset transistor is connected to the second node M.

The gate of the compensation transistor T4 is connected to the voltage level Vref of the reset signal input end, the source of the compensation transistor T4 is connected to a positive electrode of the power source VDD, and the drain of the compensation transistor T4 is connected to the first node G.

The first end of the storage capacitor Cc is connected to the first node G, and the second end of the storage capacitor is connected to the second node M. The storage capacitor Cc is configured to stabilize the gate voltage of the driving TFT T1.

The driving transistor T1, the data write-in transistor T2, the reset transistor T3, the compensation transistor T4 could respectively be a P-type or N-type TFT. That is, the driving transistor T1, the data write-in transistor T2, the reset transistor T3, the compensation transistor T4 could be all P-type TFTs or N-type TFTs. Or, a part of the driving transistor T1, the data write-in transistor T2, the reset transistor T3, the compensation transistor T4 could be P-type TFTs and the other could be N-type TFTs. It could be understood that, the driving transistor T1, the data write-in transistor T2, the reset transistor T3, the compensation transistor T4 are preferably all P-type TFTs or all N-type TFTs to prevent the differences between different type transistors from affecting the pixel compensation circuit.

The driving transistor T1, the data write-in transistor T2, the reset transistor T3 and the compensation transistor T4 are one type of low temperature poly-silicon (LTPS) TFT, oxide semiconductor TFT or amorphous silicon (a-Si) TFT.

The pixel compensation circuit orderly comprises a first period t1, a second period t2, a third period t3, a fourth period t4, a fifth period t5 and a sixth period t6. The first period t1, the second period t2, the third period t3, the fourth period t4, the fifth period t5 and the sixth period t6 could respectively be called "reset period", "detection period", "retaining period", "data write-in period", "maintaining period", and "illuminating period,"

During the first period t1, the reset transistor T3 and the compensation transistor T4 are turned on, the data write-in transistor is turned off T2, and the driving transistor T1 is turned on.

During the second period t2, the reset transistor T3 and the compensation transistor T4 are turned on, the data write-in transistor is turned off T2, and the driving transistor T1 is turned off.

During the third period t3, the reset transistor T3, the compensation transistor T4, the data write-in transistor T2 and the driving transistor T1 are all turned off.

During the fourth period t4, the driving transistor T1 and the data write-in transistor T2 are turned on, and the compensation transistor T4 and the reset transistor T3 are turned off.

During the fifth period t5, the driving transistor T1 is turned on, the data write-in transistor T2, the compensation transistor T4 and the reset transistor T3 are turned off.

During the sixth period t6, the driving transistor T1 is turned on, the data write-in transistor T2, the compensation transistor T4 and the reset transistor T3 are turned off.

When the pixel compensation circuit is working, the voltage levels of the first node and the second node during the first period t1, the second period t2, the third period t3, the fourth period t4, the fifth period t5 and the sixth period t6 are as follows:

During the first period t1, a voltage level of the first node corresponds to a voltage level VDD of the positive electrode of the power source, and a voltage level of the second node corresponds to the voltage level Vi of the reference signal input end.

During the second period t2, the voltage level of the first node corresponds to the threshold voltage Vth of the driving transistor, and the voltage level of the second node corresponds to the voltage level Vi of the reference signal input end.

During the third period t3, the voltage level of the first node corresponds to the threshold voltage Vth of the driving transistor, and the voltage level of the second node corresponds to the voltage level Vi of the reference signal input end.

During the fourth period t4, the voltage level of the first node corresponds to Vdata−Vi+Vth, and the voltage level of the second node corresponds to the voltage level Vdata of the data signal input end.

During the fifth period t5, the voltage level of the first node corresponds to Vdata−Vi+Vth, and the voltage level of the second node corresponds to the voltage level Vdata of the data signal input end.

During the sixth period t6, the voltage level of the first node corresponds to Vdata−Vi+Vth, and the voltage level of the second node corresponds to the voltage level Vdata of the data signal input end.

Here, the voltage level Vi of the reference signal input end is constant and the voltage level Vi of the reference signal input end is not larger than the voltage level Vdata of the data signal input end.

Based on the above embodiment, the driving transistor T1, the data write-in transistor T2, the reset transistor T3 and the compensation transistor T4 are all N-type TFTs as an example. The voltage level VDD of the positive electrode of the power source of the pixel compensation circuit, the voltage level Vi of the reference signal input end, the voltage level Vref of the reset signal input end, the voltage level Vdata of the data signal input end in the first period t1, the second period t2, the third period t3, the fourth period t4, the fifth period t5 and the sixth period t6 are as follows:

During the first period t1, the voltage level VDD of the power source and the voltage level Vref of the reset signal input end correspond to a high voltage level, and the voltage level WR of the write-in signal input end and the voltage level Vdata of the data signal input end correspond to a low voltage level.

During the second period t2, the voltage level Vref of the reset signal input end corresponds to a high voltage level, and the voltage level VDD of the power source, the voltage level WR of the write-in signal input end and the voltage level Vdata of the data signal input end correspond to a low voltage level.

During the third period t3, the voltage level Vref of the reset signal input end, the voltage level VDD of the power source, the voltage level WR of the write-in signal input end and the voltage level Vdata of the data signal input end all correspond to a low voltage level.

During the fourth period t4, the voltage level WR of the write-in signal input end and the voltage level Vdata of the data signal input end correspond to a high voltage level and the voltage level Vref of the reset signal input end and the voltage level VDD of the power source corresponds to a low voltage level.

During the fifth period t5, the voltage level Vref of the reset signal input end, the voltage level VDD of the power source, the voltage level WR of the write-in signal input end and the voltage level Vdata of the data signal input end all correspond to a low voltage level.

During the sixth period t6, the voltage level VDD of the power source corresponds to a high voltage level, and the voltage level Vref of the reset signal input end, the voltage level WR of the write-in signal input end and the voltage level Vdata of the data signal input end all correspond to a low voltage level.

During the sixth period, the driving current flowing through the driving transistor is $I=K(Vdata-Vi)^2$. Here, I represents the driving current, K is an intrinsically conductive factor of the driving transistor, Vdata is the voltage level of the data signal input end, and Vi is the voltage level of the reference signal input end.

According to the present disclosure, the pixel compensation circuit comprises a driving transistor, a data write-in transistor, a reset transistor, a compensation transistor and a storage capacitor. Through setting the voltage level of the reset signal input end, the voltage level of the references signal input end, the voltage level of the write-in signal input end and the voltage level of the data signal input end, the pixel compensation circuit orderly enters the first period, the second period, the third period, the fourth period, the fifth period and the sixth period. In this way, through detecting the threshold voltage of the driving transistor and offsetting the threshold voltage of the driving transistor from the driving current of the light emitting unit, the driving current becomes unrelated to the threshold voltage of the driving transistor. In other words, if the threshold voltage of the driving transistor shifts, the driving current of the light emitting unit is unaffected. This could be used to solve the conventional issues of uneven display effect when the threshold voltage of the driving transistor shifts.

Figure 3:
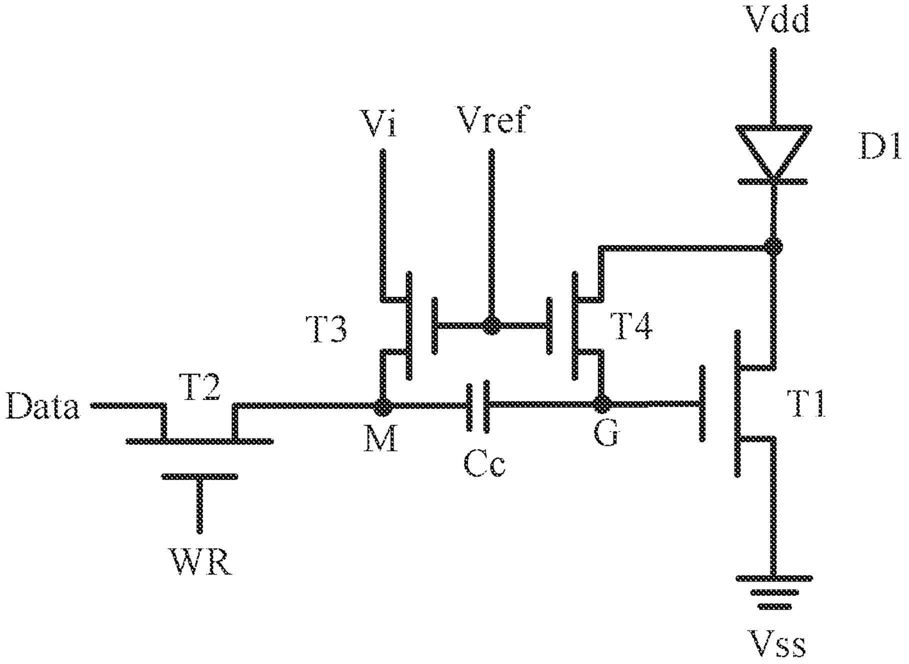
FIG. 3 is a diagram of a display panel according to an embodiment of the present disclosure.

Please refer to FIG. 3. FIG. 3 is a diagram of a display panel according to an embodiment of the present disclosure. As shown in FIG. 3, a display panel is disclosed. The display panel comprises a light emitting unit D1 and the above-mentioned pixel compensation circuit. The pixel compensation circuit is connected to the cathode of the light emitting unit D1 and the anode of the light emitting unit D1 is connected to the positive electrode of the power source. The display panel and the pixel compensation circuit have a similar structure and benefits. Since the pixel compensation circuit has been illustrated above, further explanations are omitted here.

Figure 2:
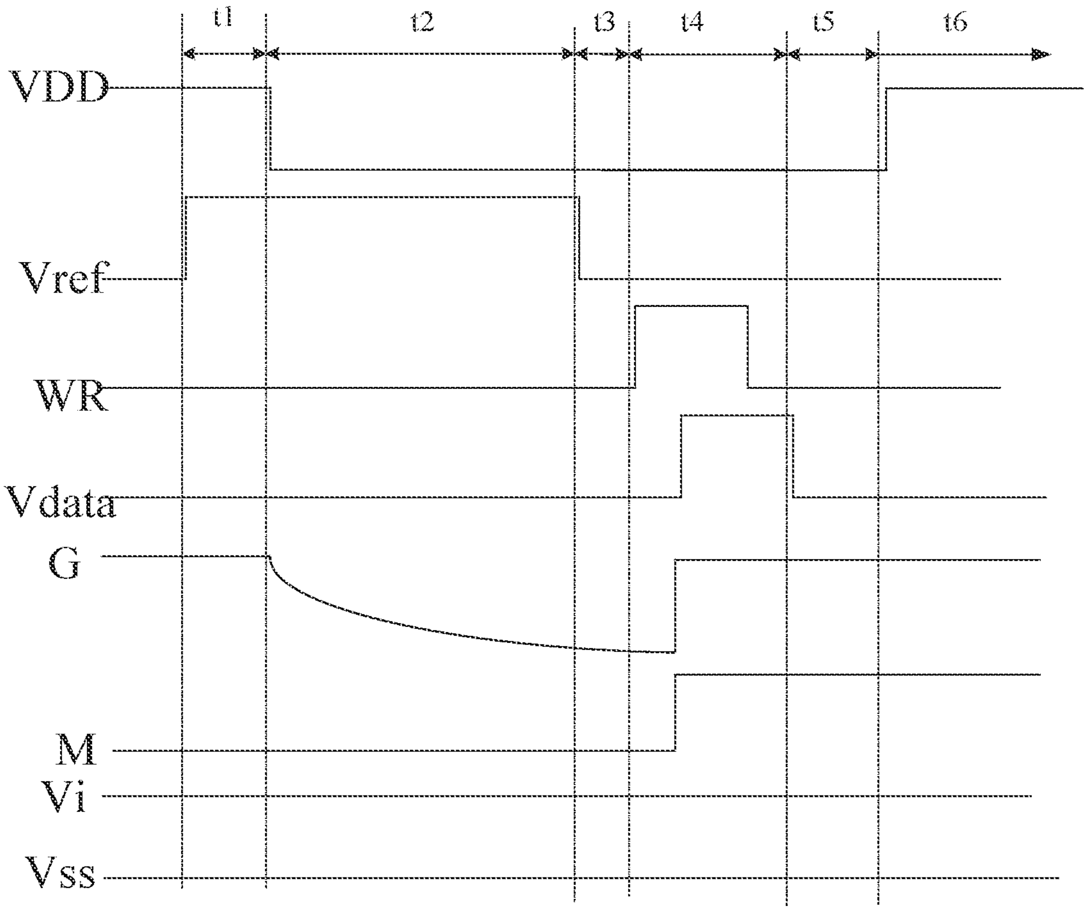
FIG. 2 is a timing diagram of a pixel compensation circuit according to an embodiment of the present disclosure.

The driving transistor T1, the data write-in transistor T2, the reset transistor T3 and the compensation transistor T4 in the pixel compensation circuit are all N-type TFTs as an example. The working flow of the pixel compensation circuit will be illustrated in detail below. Please refer to FIG. 2. FIG. 2 is a timing diagram of a pixel compensation circuit according to an embodiment of the present disclosure. Here, FIG. 2 is a timing diagram when the driving transistor T1, the data write-in transistor T2, the reset transistor T3 and the compensation transistor T4 in FIG. 1 are all N-type TFTs. The pixel compensation circuit comprises following six working periods:

When the pixel compensation circuit is in the first period t1, the voltage level VDD of the power source and the voltage level Vref of the reset signal input end correspond to a high voltage level, and the voltage level WR of the write-in signal input end and the voltage level Vdata of the data signal input end correspond to a low voltage level. The data write-in transistor T2 is turned off such that the reset transistor T3, the compensation transistor T4 and the driving transistor T1 are turned on. In this way, the voltage level of the second node M is reset to the voltage level Vi of the reference signal input end under the control the reset transistor T3. The voltage level VDD of the positive electrode of the power source corresponds to a high voltage level to charge the first node G through the light emitting unit D1 and the compensation transistor T4 to pull up the voltage level of the first node G to the voltage level VDD of the positive electrode of the power source.

When the pixel compensation circuit is in the second period t2, the voltage level Vref of the reset signal input end corresponds to a high voltage level, and the voltage level VDD of the power source, the voltage level WR of the write-in signal input end and the voltage level Vdata of the data signal input end correspond to a low voltage level. Accordingly, the data write-in transistor T2 is turned off and the reset transistor T3 and the compensation transistor T4 are turned on. The voltage level of the second node M remains the same. The driving transistor T1 behaves as a diode. Because the voltage level VDD of the positive electrode of the power source is switched from a high voltage level to a low voltage level, the light emitting unit D1 is cut off. In this way, the voltage level of the first node G is released through the negative electrode Vss of the power source until the difference between the gate (the first node G) and the source (the end connected to the voltage Vss of the negative electrode of the power source, which is 0) of the driving transistor T1 is reduced to the threshold voltage Vth of the driving transistor T1. Accordingly, the driving transistor T1 is turned off. At this time, the voltage difference Vgs (Vg−Vs) between the gate and the source of the driving transistor is Vth (Vgs=Vth). Here, Vs=0 and thus Vg=Vth. Through this, the threshold voltage Vth of the driving transistor T1 is written into the first node G. That is, through detecting the first node G corresponds to the threshold voltage Vth of the driving transistor T1, the threshold voltage Vth of the driving transistor T1 could be detected and obtained.

When the pixel compensation circuit is in the third period t3, the voltage level Vref of the reset signal input end, the voltage level VDD of the power source, the voltage level WR of the write-in signal input end and the voltage level Vdata of the data signal input end all correspond to a low voltage level. In this way, the reset transistor T3, the compensation transistor T4, the driving transistor T1 and the data write-in transistor T2 are all turned off.

When the pixel compensation circuit is in the fourth period t4, the voltage level WR of the write-in signal input end and the voltage level Vdata of the data signal input end correspond to a high voltage level and the voltage level Vref of the reset signal input end and the voltage level VDD of the power source corresponds to a low voltage level. Accordingly, the driving transistor T1 and the data write-in transistor T2 are turned on, and the reset transistor T3 and the compensation transistor T4 are turned off such that the voltage level Vdata of the data signal input is written into the second M through the data write-in transistor T2 and the voltage level of the first node G is pulled up from the threshold voltage Vth of the driving transistor T1 to Vth+Vdata−Vi (adding the difference between the voltage Vdata of the data siganl input end and the voltage Vi of the reference signal input end) due to the coupling effect of the storage capacitor Cc (the voltage difference between the two ends of the storage capacitor Cc cannot suddenly change).

When the pixel compensation circuit is in the fifth period t5, the voltage level Vref of the reset signal input end, the voltage level VDD of the power source, the voltage level WR of the write-in signal input end and the voltage level Vdata of the data signal input end all correspond to a low voltage level. Accordingly, the driving transistor T1 is turned on, and the reset transistor T3, the compensation transistor T4 and the data write-in transistor T2 are turned off. At this time, the connection between the voltage level Vdata of the data signal input end and the second node M is broken. The voltage level of the first node G remains the same due to the coupling effect of the storage capacitor Cc.

When the pixel compensation circuit is in the sixth period t6, the voltage level VDD of the power source corresponds to a high voltage level, and the voltage level Vref of the reset signal input end, the voltage level WR of the write-in signal input end and the voltage level Vdata of the data signal input end all correspond to a low voltage level. Accordingly, the driving transistor T1 is turned on, and the reset transistor T3, the compensation transistor T4 and the data write-in transistor T2 are turned off. At this time, the voltage level VDD of the positive electrode of the power source is switched from a low voltage level to a high voltage level. The voltage level of the first node G Vth+Vdata−Vi<Vdd. Therefore, the driving transistor T1 is working in the saturation region. According to the current equation $I=K(Vgs-Vth)^2$ of the light emitting unit D1 (here, I represents the driving current, K is an intrinsically conductive factor of the driving transistor, Vdata is the voltage level of the data signal input end, Vgs is the voltage difference between the gate and the source of the driving transistor T1, and Vth is the threshold voltage of the driving transistor T1), the current flowing through the light emitting unit D1 could be determined as: $I=K(Vgs-Vth)^2=K(Vth+Vdata-Vi-Vth)^2=K(Vdata-Vi)^2$. In this way, the light emitting unit D1 is illuminated and the driving current is unrelated to the threshold voltage Vth. In other words, the pixel compensation circuit could compensate the influence introduced by the threshold voltage of the driving transistor T1.

According to another embodiment, a display device is disclosed. The display device comprises the above-mentioned display panel. The display device and the display panel have a similar structure and benefits. Since the display panel has been illustrated above, further explanations are omitted here.

In the pixel compensation circuit, the display panel and the display device according to an embodiment of the present disclosure the pixel compensation circuit adopts a 4T1C structure. That is, the pixel compensation circuit comprises a driving transistor T1, a data write-in transistor T2, a reset transistor T3, a compensation transistor T4 and a storage capacitor Cc. Through setting the voltage level Vref of the reset signal input end, the voltage level Vi of the references signal input end, the voltage level WR of the write-in signal input end and the voltage level Vdata of the data signal input end, the pixel compensation circuit orderly enters the reset period t1, the detection period t2, the retaining period t3, the data write-in period t4, the maintaining period t5 and the illuminating period t6. In this way, through detecting the threshold voltage of the driving transistor T1 and offsetting the threshold voltage of the driving transistor T1 from the driving current of the light emitting unit D1, the driving current becomes unrelated to the threshold voltage Vth of the driving transistor T1. In other words, if the threshold voltage Vth of the driving transistor T1 shifts, the driving current of the light emitting unit D1 is unaffected. This could be used to solve the conventional issues of uneven display effect when the threshold voltage of the driving transistor shifts.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. A pixel compensation circuit, comprising: a driving transistor, a data write-in transistor, a reset transistor, a compensation transistor, and a storage capacitor;

wherein a gate of the driving transistor is connected to a first node and a source of the driving transistor is connected to a negative electrode of a power source;

wherein a gate of the data write-in transistor is connected to a write-in signal input end, a source of the data write-in transistor is connected to a data signal input end, and a drain of the data write-in transistor is connected to a second node;

wherein a gate of the reset transistor is connected to a reset signal input end, a source of the reset transistor is connected to a reference signal input end, and a drain of the reset transistor is connected to the second node;

wherein a gate of the compensation transistor is connected to a reset signal input end, a source of the compensation transistor is connected to a positive electrode of the power source, and a drain of the compensation transistor is connected to the first node; and wherein a first end of the storage capacitor is connected to the first node, and a second end of the storage capacitor is connected to the second node;

wherein during a first period, the reset transistor and the compensation transistor are turned on, the data write-in transistor is turned off, and the driving transistor is turned on;

wherein during a second period after the first period, the reset transistor and the compensation transistor are turned on, the data write-in transistor is turned off, and the driving transistor is turned off;

wherein during a third period after the second period, the reset transistor, the compensation transistor, the data write-in transistor and the driving transistor are all turned off;

wherein during a fourth period after the third period, the driving transistor and the data write-in transistor are turned on, and the compensation transistor and the reset transistor are turned off;

wherein during a fifth period after the fourth period, the driving transistor is turned on, the data write-in transistor, the compensation transistor and the reset transistor are turned off; and wherein during a sixth period after the fifth period, the driving transistor is turned on, the data write-in transistor, the compensation transistor and the reset transistor are turned off.

2. The pixel compensation circuit of claim 1, wherein during the first period, a voltage level of the first node corresponds to a voltage level VDD of the positive electrode of the power source, and a voltage level of the second node corresponds to a voltage level Vi of a reference signal input end;

wherein during the second period, the voltage level of the first node corresponds to a threshold voltage Vth of the driving transistor, and the voltage level of the second node corresponds to the voltage level Vi of the reference signal input end;

wherein during the third period, the voltage level of the first node corresponds to the threshold voltage Vth of the driving transistor, and the voltage level of the second node corresponds to the voltage level Vi of the reference signal input end;

wherein during the fourth period, the voltage level of the first node corresponds to $Vdata-Vi+Vth$, and the voltage level of the second node corresponds to a voltage level of the data signal input end Vdata;

wherein during the fifth period, the voltage level of the first node corresponds to $Vdata-Vi+Vth$, and the voltage level of the second node corresponds to the voltage level of the data signal input end Vdata; and wherein during the sixth period, the voltage level of the first node corresponds to $Vdata-Vi+Vth$, and the voltage level of the second node corresponds to the voltage level Vdata of the data signal input end.

3. The pixel compensation circuit of claim 2, wherein the voltage level Vi of the reference signal input end is constant and the voltage level Vi of the reference signal input end is not larger than the voltage level Vdata of the data signal input end.

4. The pixel compensation circuit of claim 2, wherein during the sixth period, a driving current flowing through the driving transistor is $I=K(Vdata-Vi)^2$, where I represents the driving current, K is an intrinsically conductive factor of the driving transistor, Vdata is the voltage level of the data signal input end, and Vi is the voltage level of the reference signal input end.

5. The pixel compensation circuit of claim 1, wherein the driving transistor, the data write-in transistor, the reset transistor and the compensation transistor are P-type thin film transistors (TFT) or N-type TFTs.

6. The pixel compensation circuit of claim 1, wherein the driving transistor, the data write-in transistor, the reset transistor and the compensation transistor are one type of low temperature poly-silicon (LTPS) TFT, oxide semiconductor TFT or amorphous silicon (a-Si) TFT.

7. A display panel, comprising:

a light emitting unit, having an anode connected to a positive electrode of a power source and a cathode; and a pixel compensation circuit, connected to the cathode of the light emitting unit and, comprising a driving transistor, a data write-in transistor, a reset transistor, a compensation transistor, and a storage capacitor;

wherein a gate of the driving transistor is connected to a first node and a source of the driving transistor is connected to a negative electrode of a power source, a drain of the driving transistor is connected to the cathode of the light emitting unit;

wherein a gate of the data write-in transistor is connected to a write-in signal input end, a source of the data write-in transistor is connected to a data signal input end, and a drain of the data write-in transistor is connected to a second node;

wherein a gate of the reset transistor is connected to a reset signal input end, a source of the reset transistor is connected to a reference signal input end, and a drain of the reset transistor is connected to the second node;

wherein a gate of the compensation transistor is connected to a reset signal input end, a source of the compensation transistor is connected to a positive electrode of the power source, and a drain of the compensation transistor is connected to the first node; and wherein a first end of the storage capacitor is connected to the first node, and a second end of the storage capacitor is connected to the second node;

wherein during a first period, the reset transistor and the compensation transistor are turned on, the data write-in transistor is turned off, and the driving transistor is turned on;

wherein during a second period after the first period, the reset transistor and the compensation transistor are turned on, the data write-in transistor is turned off, and the driving transistor is turned off;

wherein during a third period after the second period, the reset transistor, the compensation transistor, the data write-in transistor and the driving transistor are all turned off;

wherein during a fourth period after the third period, the driving transistor and the data write-in transistor are turned on, and the compensation transistor and the reset transistor are turned off;

wherein during a fifth period after the fourth period, the driving transistor is turned on, the data write-in transistor, the compensation transistor and the reset transistor are turned off; and wherein during a sixth period after the fifth period, the driving transistor is turned on, the data write-in transistor, the compensation transistor and the reset transistor are turned off.

8. The display panel of claim 7, wherein during the first period, a voltage level of the first node corresponds to a voltage level VDD of the positive electrode of the power source, and a voltage level of the second node corresponds to a voltage level Vi of a reference signal input end;

wherein during the second period, the voltage level of the first node corresponds to a threshold voltage Vth of the driving transistor, and the voltage level of the second node corresponds to the voltage level Vi of the reference signal input end;

wherein during the third period, the voltage level of the first node corresponds to the threshold voltage Vth of the driving transistor, and the voltage level of the second node corresponds to the voltage level Vi of the reference signal input end;

wherein during the fourth period, the voltage level of the first node corresponds to Vdata−Vi+Vth, and the voltage level of the second node corresponds to a voltage level of the data signal input end Vdata;

wherein during the fifth period, the voltage level of the first node corresponds to Vdata−Vi+Vth, and the voltage level of the second node corresponds to the voltage level of the data signal input end Vdata; and wherein during the sixth period, the voltage level of the first node corresponds to Vdata−Vi+Vth, and the voltage level of the second node corresponds to the voltage level Vdata of the data signal input end.

9. The display panel of claim 8, wherein the voltage level Vi of the reference signal input end is constant and the voltage level Vi of the reference signal input end is not larger than the voltage level Vdata of the data signal input end.

10. The display panel of claim 8, wherein during the sixth period, a driving current flowing through the driving transistor is $I=K(Vdata-Vi)^2$, where I represents the driving current, K is an intrinsically conductive factor of the driving transistor, Vdata is the voltage level of the data signal input end, and Vi is the voltage level of the reference signal input end.

11. The display panel of claim 7, wherein the driving transistor, the data write-in transistor, the reset transistor and the compensation transistor are P-type thin film transistors (TFT) or N-type TFTs.

12. The display panel of claim 7, wherein the driving transistor, the data write-in transistor, the reset transistor and the compensation transistor are one type of low temperature poly-silicon (LTPS) TFT, oxide semiconductor TFT or amorphous silicon (a-Si) TFT.

13. A display device, comprising a display panel, the display panel comprising:

a light emitting unit, having an anode connected to a positive electrode of a power source and a cathode; and a pixel compensation circuit, connected to the cathode of the light emitting unit and, comprising a driving transistor, a data write-in transistor, a reset transistor, a compensation transistor, and a storage capacitor;

wherein a gate of the driving transistor is connected to a first node and a source of the driving transistor is connected to a negative electrode of a power source, a drain of the driving transistor is connected to the cathode of the light emitting unit;

wherein a gate of the data write-in transistor is connected to a write-in signal input end, a source of the data write-in transistor is connected to a data signal input end, and a drain of the data write-in transistor is connected to a second node;

wherein a gate of the reset transistor is connected to a reset signal input end, a source of the reset transistor is connected to a reference signal input end, and a drain of the reset transistor is connected to the second node;

wherein a gate of the compensation transistor is connected to a reset signal input end, a source of the compensation transistor is connected to a positive electrode of the power source, and a drain of the compensation transistor is connected to the first node; and wherein a first end of the storage capacitor is connected to the first node, and a second end of the storage capacitor is connected to the second node, wherein during a first period, the reset transistor and the compensation transistor are turned on, the data write-in transistor is turned off, and the driving transistor is turned on;

wherein during a second period after the first period, the reset transistor and the compensation transistor are turned on, the data write-in transistor is turned off, and the driving transistor is turned off;

wherein during a third period after the second period, the reset transistor, the compensation transistor, the data write-in transistor and the driving transistor are all turned off;

wherein during a fourth period after the third period, the driving transistor and the data write-in transistor are turned on, and the compensation transistor and the reset transistor are turned off;

wherein during a fifth period after the fourth period, the driving transistor is turned on, the data write-in transistor, the compensation transistor and the reset transistor are turned off; and wherein during a sixth period after the fifth period, the driving transistor is turned on, the data write-in transistor, the compensation transistor and the reset transistor are turned off.

14. The display device of claim 13, wherein during the first period, a voltage level of the first node corresponds to a voltage level VDD of the positive electrode of the power source, and a voltage level of the second node corresponds to a voltage level Vi of a reference signal input end;

wherein during the second period, the voltage level of the first node corresponds to a threshold voltage Vth of the driving transistor, and the voltage level of the second node corresponds to the voltage level Vi of the reference signal input end;

wherein during the third period, the voltage level of the first node corresponds to the threshold voltage Vth of the driving transistor, and the voltage level of the second node corresponds to the voltage level Vi of the reference signal input end;

wherein during the fourth period, the voltage level of the first node corresponds to Vdata−Vi+Vth, and the voltage level of the second node corresponds to a voltage level of the data signal input end Vdata;

wherein during the fifth period, the voltage level of the first node corresponds to Vdata−Vi+Vth, and the voltage level of the second node corresponds to the voltage level of the data signal input end Vdata; and wherein during the sixth period, the voltage level of the first node corresponds to Vdata−Vi+Vth, and the voltage level of the second node corresponds to the voltage level Vdata of the data signal input end.

15. The display device of claim 14, wherein the voltage level Vi of the reference signal input end is constant and the voltage level Vi of the reference signal input end is not larger than the voltage level Vdata of the data signal input end.

16. The display device of claim 14, wherein during the sixth period, a driving current flowing through the driving transistor is $I=K(Vdata-Vi)^2$, where I represents the driving current, K is an intrinsically conductive factor of the driving transistor, Vdata is the voltage level of the data signal input end, and Vi is the voltage level of the reference signal input end.

17. The display device of claim 13, wherein the driving transistor, the data write-in transistor, the reset transistor and the compensation transistor are P-type thin film transistors (TFT) or N-type TFTs.

18. The display device of claim 13, wherein the driving transistor, the data write-in transistor, the reset transistor and the compensation transistor are one type of low temperature poly-silicon (LTPS) TFT, oxide semiconductor TFT or amorphous silicon (a-Si) TFT.

* * * * *